United States Patent

Steele, Jr. et al.

[11] 4,099,706
[45] Jul. 11, 1978

[54] VALVE CONSTRUCTION AND METHOD OF MAKING THE SAME

[75] Inventors: Everett T. Steele, Jr.; Marvin P. Weaver, both of Knoxville, Tenn.

[73] Assignee: Robertshaw Controls Company, Richmond, Va.

[21] Appl. No.: 748,860

[22] Filed: Dec. 9, 1976

[51] Int. Cl.² .......................................... F16K 27/04
[52] U.S. Cl. .................................. 251/367; 137/269; 285/32; 285/286; 285/DIG. 14
[58] Field of Search .................. 285/32, 286, DIG. 14; 251/367; 137/269

[56] References Cited

U.S. PATENT DOCUMENTS

| 2,741,402 | 4/1956 | Sayre | 285/286 |
|---|---|---|---|
| 3,199,538 | 8/1965 | Anthon | 251/367 |
| 3,268,248 | 8/1966 | Chambers | 285/286 |
| 3,714,958 | 2/1973 | Johnson et al. | 285/286 UX |
| 3,989,058 | 11/1976 | Jackson et al. | 137/269 |

FOREIGN PATENT DOCUMENTS

| 467,445 | 1/1928 | Fed. Rep. of Germany | 285/286 |
|---|---|---|---|
| 615,055 | 2/1932 | Fed. Rep. of Germany | 285/286 |
| 875,108 | 7/1949 | Fed. Rep. of Germany | 285/286 |

OTHER PUBLICATIONS

"How to Get Good Ultrasonic Welds", 11/1964, Branson Sonic Power, by E. Obeda.
"Joint Design for Ultrasonic Welding", 1/24/67, Branson Sonic Power.

*Primary Examiner*—William R. Cline
*Assistant Examiner*—H. Jay Spiegel
*Attorney, Agent, or Firm*—Candor, Candor & Tassone

[57] ABSTRACT

A valve construction having a first housing provided with an internal chamber and an inwardly directed shoulder projecting into the chamber at one end thereof and defining a valve seat on one side thereof. A second housing is secured to the first housing and has a chamber aligned with the chamber of the first housing, the second housing having an inwardly directed shoulder projecting into its chamber at one end thereof. A resilient annular member is disposed against one side of the shoulder of the first housing and against an adjacent side of the shoulder of the second housing while projecting inwardly beyond the shoulders to define the valve seat. One of the housings has an annular groove in the shoulder thereof inboard of the inner and outer peripheries thereof and receives an annular tongue projecting from the shoulder of the other housing, the tongue having an inner side thereof engaging the outer periphery of the resilient annular member and being ultrasonically welded substantially only on the outer side thereof to the housing that has the groove whereby the resulting weld area is isolated from the resilient annular member.

24 Claims, 9 Drawing Figures

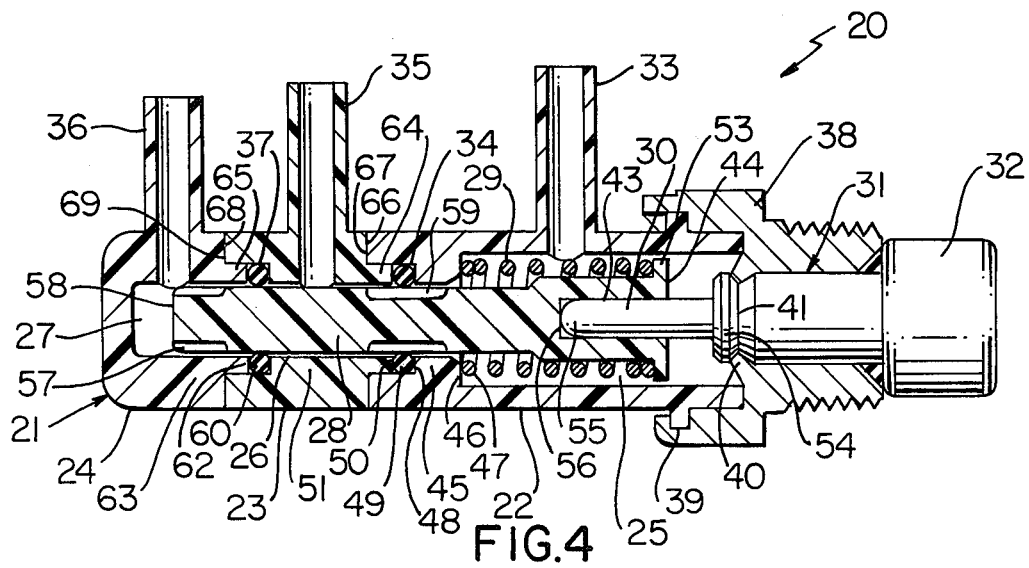

VALVE CONSTRUCTION AND METHOD OF MAKING THE SAME

This invention relates to an improved valve construction and method of making the same.

It is well known that a condition responsive valve construction can be made from a plurality of parts wherein a plurality of housing members are stacked together in aligned relation to produce the desired number of valve seats and ports to be interconnected by an axially movable valve member disposed in the aligned chambers of the housing parts. For example, see the U.S. Pat. Nos. 3,122,168; 3,199,538; 3,202,170; 3,315,702; 3,516,442 and 3,719,199 for such prior known modular valve constructions.

Also, see the copending patent application Ser. No. 596,565, filed July 16, 1975, wherein a valve construction is provided and has a plurality of housing members disposed together in such a manner that a valve seat is defined between each pair of adjacent housing members and is defined by a resilient annular member disposed against one side of a shoulder of one of the housing members and an adjacent shoulder of another housing member whereby the resilient annular member projects inwardly beyond the shoulders to be disposed in sealing engagement with an axially movable valve member for the valve construction.

However, it was found according to the teachings of this invention that such prior known valve construction of the aforementioned patent application did not readily lend itself to having the housing members thereof ultrasonically welded together because the flashings from the resulting weld areas reached the resilient annular members and thereby adversely affected the sealing function thereof.

Accordingly, it is a feature of this invention to provide an improved valve construction of the above type wherein two or more housing members can be ultrasonically welded together with the resulting weld area therebetween being isolated from the resilient annular member that forms the valve seat thereof.

In particular, one embodiment of this invention provides a valve construction having a first housing means provided with an internal chamber therein and an inwardly directed shoulder projecting into the chamber at one end thereof and defining a first valve seat on one side thereof. A second housing means is secured to the first housing means and has a chamber aligned with the chamber of the first housing means, the second housing means having an inwardly directed shoulder projecting into its respective chamber at one end thereof. The first valve seat comprises a resilient annular member disposed against one side of the shoulder of the first housing means and against an adjacent side of the shoulder of the second housing means while projecting inwardly beyond the shoulders. One of the housing means has an annular groove in the shoulder thereof inboard of the inner and outer peripheries thereof. The other of the housing means has an annular tongue projecting from the shoulder thereof inboard of the inner and outer peripheries thereof, the tongue having the inner side thereof engaging the outer periphery of the resilient annular member. The tongue is received in the groove and is ultrasonically welded substantially only on the outer side thereof to the housing means having the groove whereby the resulting weld area is isolated from the resilient annular member.

Accordingly, it is an object of this invention to provide an improved valve construction having one or more of the novel features of this invention as set forth above or hereinafter shown or described.

Another object of this invention is to provide a method of making such a valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof, and wherein:

FIG. 4 is a view similar to FIG. 2 and illustrates the valve construction in another operating condition thereof.

FIG. 6 is a view similar to FIG. 2 and illustrates one embodiment of the valve construction of this invention.

FIG. 7 is a view similar to FIG. 6 and illustrates another embodiment of the valve construction of this invention.

Figure 1:
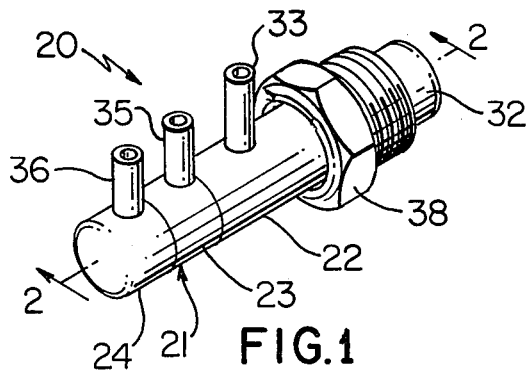
FIG. 1 is a perspective view of a condition responsive valve construction of the aforementioned copending U.S. patent application, Ser. No. 596,565, and, thus, is prior art to this invention.
Figure 3:
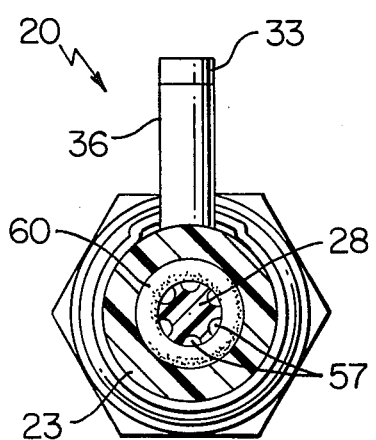
FIG. 3 is a cross-sectional view taken on line 3—3 of FIG. 2.
Figure 5:
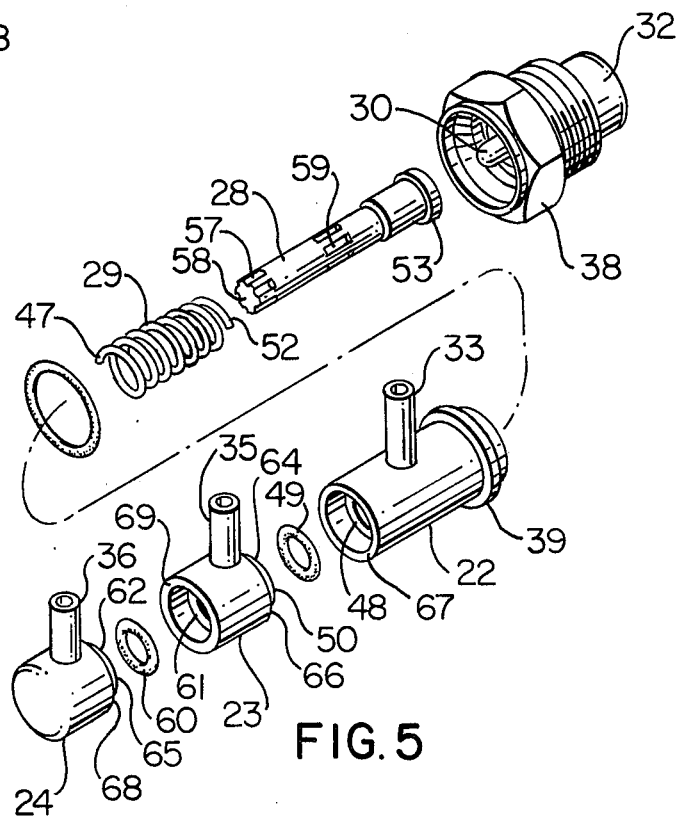
FIG. 5 is an exploded perspective view of the parts of the valve construction of FIG. 1.

While the various features of this invention are hereinafter described and illustrated as being particularly adapted to provide a condition responsive valve construction, it is to be understood that the various features of this invention can be utilized singly or in any combination thereof to provide a valve construction operated by any desired means.

Therefore, this invention is not to be limited to only the embodiments illustrated in the drawings, because the drawings are merely utilized to illustrate one of the wide variety of uses of this invention.

It is believed that in order to best understand the features of this invention, the valve construction of the aforementioned co-pending patent application Ser. No. 596,565 should be first described. Thus, referring now to FIGS. 1-5, one embodiment of the valve construction of the aforementioned co-pending patent application is generally indicated by the reference numeral 20 and comprises a housing means that is generally indicated by the reference numeral 21 and formed of a plurality of housing parts 22, 23, and 24 secured together in aligned relation in a manner hereinafter described and respectively having aligned chambers 25, 26, and 27 therein respectively receiving an axially movable valve member 28 which is normally urged to the right in FIG. 2 by a compression spring 29 and is operatively interconnected to a piston 30 of a piston and cylinder arrangement 31 that is temperature responsive and is carried by the housing part 22 in a manner hereinafter described.

Figure 2:
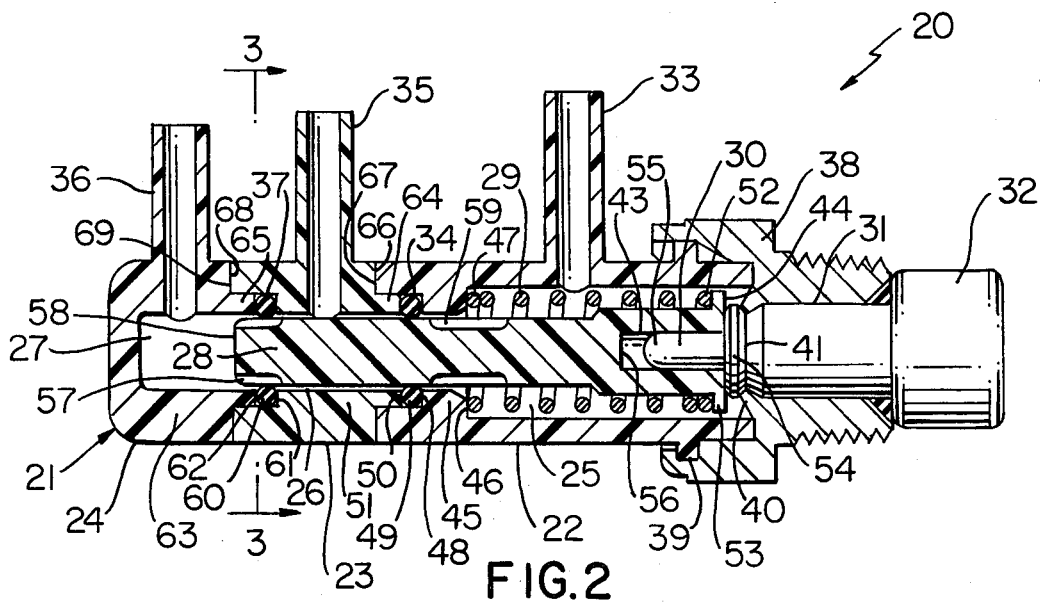
FIG. 2 is an enlarged cross-sectional view of the valve construction of FIG. 1 and is taken on the line 2—2 of FIG. 1.

In this manner, when a temperature responsive medium, such as a thermally responsive wax charge that is disposed within the cylinder 32 of the piston and cylinder arrangement 31, expands upon reaching a certain temperature, the same acts against the piston 30 to move the same and, thus, the valve member 28 to the left from the position illustrated in FIG. 2 to the position illustrated in FIG. 4 to fluidly interconnect a port means 33 of the housing part 22 around a first valve seat means 34 of the housing part 22 to a port means 35 of the second housing part 23.

Conversely, when the temperature being sensed by the temperature responsive device 31 falls below a certain temperature, the wax charge within the cylinder 32 contracts and thereby permits the compression spring 29 to move the valve member 28 back from the position illustrated in FIG. 4 to the position illustrated in FIG. 2 whereby the valve member 28 closes the valve seat 34 while interconnecting the port means 35 of the housing part 23 to a port means 36 of the housing part 24 around a second valve seat 37 of the housing part 23 in a manner hereinafter described.

The housing part 22 includes a retainer 38 turned over an outwardly directed flange 39 of the housing part 22 with the retainer 38 itself having an inwardly turned flange 40 being turned into an annular groove 41 of the cylinder 32 of the piston and cylinder arrangement 31 to hold the piston and cylinder arrangement to the retainer 38 and, thus, to the housing part 22.

The axially movable valve member 28 has a bore 43 interrupting the right end 44 thereof and telescopically receives the piston 30 of the temperature responsive device 31 therein as illustrated in FIG. 2.

The housing part 22 has an inwardly directed annular shoulder 45 defining a spring seat 46 on one side thereof and against which one end 47 of the compression spring 29 abuts while the other side 48 of the shoulder 45 defines the first valve seat 34 which comprises an annular resilient member 49, such as a rubber O-ring or the like, being compressed between the side 48 of the shoulder 45 of the housing part 22 and a side 50 of an inwardly directed annular shoulder 51 on the housing part 23 as illustrated whereby the resilient member 49 projects inwardly beyond the annular shoulders 45 and 51 of the housing parts 22 and 23 to sealingly engage against the valve member 28 as illustrated. Additionally, the resilient member 49 seals the housing parts 22 and 23 together as illustrated.

The other end 52 of the compression spring 29 bears against an outwardly directed annular flange 53 at the end 44 of the valve member 28 to tend to force the valve member 28 to the right in FIG. 2 and against an end 54 of the cylinder 32 as illustrated whereby movement of the valve member 28 to the right is limited by the end 54 of the cylinder 32 of the temperature responsive device 31 even though the piston 30 of the device 31 is adapted to move further to the right through the contracting of the wax charge in the device 31 so that its free end 55 may be disposed slightly spaced from the closed end 56 of the bore 43 of the valve member 28 as illustrated in FIG. 2.

When the valve member 28 of the valve construction 20 is disposed in the position illustrated in FIG. 2, it can be seen that a plurality of grooves 57 formed in the outer periphery of the valve member 28, in a space parallel manner about the end 58 thereof, bridge the valve seat 37 so as to continuously interconnect the ports 35 and 36 together.

Another set of a plurality of spaced parallel grooves 59 are formed in the valve member 28 and are so positioned thereon that when the valve member 28 is disposed in the position illustrated in FIG. 2, the grooves 59 cannot bridge the valve seat 34 until the valve member 28 is moved to the left as illustrated in FIG. 4 whereby the ports 33 and 35 are interconnected together by the grooves 59 and since the grooves 57 have now been moved away from a bridging of the valve seat 37, the ports 35 and 36 are sealed from each other by the valve member 28 as hereinafter described.

The second valve seat means 37 also comprises an annular resilient member 60 disposed in compressed relation between the side 61 of the annular shoulder 51 of the housing part 23 and a side 62 of an inwardly directed annular shoulder 63 of the housing part or end cap 24 as illustrated whereby the resilient member 60 not only inwardly projects beyond the annular shoulders 51 and 63 of the housing parts 23 and 24 as illustrated to sealingly engage against the valve member 28, but also the member 60 provides a seal between the housing parts 23 and 24 as illustrated.

The annular shoulder 51 of the housing part 23 is so constructed and arranged that its right hand end 64 is telescoped within the housing part 22 as illustrated while the right hand end 65 of the shoulder 63 of the housing part 24 is likewise telescoped within the housing part 23 as illustrated whereby the abutting adjacent surfaces 66 and 67 of the housing parts 22 and 23 and the abutting adjacent surfaces 68 and 69 of the housing parts 23 and 24 are secured together in the assembled relation illustrated in a manner hereinafter described.

It can readily be seen that the housing parts 22, 23 and 24 can be assembled together in a simple and effective manner with the ports 33, 35 and 36 thereof either being disposed in the aligned relation illustrated in FIG. 1 or being disposed in other rotational positions relative to each other depending upon the desired conduit coupling arrangement thereto as the case may be.

Also, if the housing parts 22, 23 and 24 are formed of plastic material, the same can be readily molded in any selected colors so that the same can be readily coded for convenience in hooking the ports thereof into the desired system.

Thus, it can be seen that the valve construction 20 can be formed in a simple and effective manner to operate in a manner now to be described.

When the temperature being sensed by the temperature responsive device 31 is below a certain temperature whereby the wax charge within the cylinder 32 is in a compacted or contracted condition, the force of the compression spring 29 maintains the valve member 28 to the right against the shoulder 54 of the cylinder 32 whereby the grooves 57 in the valve member 28 fluidly interconnect the ports 35 and 36 together and the closed valve seat 34 prevents fluid interconnection between the ports 33 and 35 because the grooves 59 in the valve member 28 are not bridging the valve seat 34 at this time.

However, when the temperature being sensed by the device 31 increases to a predetermined temperature, the wax charge within the cylinder 32 of the device 31 causes the piston 30 to extend to the left in the manner illustrated in FIG. 4 and abut against the end 56 of the bore 43 of the valve member 28 to move the valve member 28 axially to the left in opposition to the force of the compression spring 29 to the position illustrated in FIG. 4 whereby the valve seat means 37 is now closed by the ungrooved portion of the valve member 28 so that the ports 35 and 36 are no longer interconnected together. However, the grooves 59 in the valve member 28 are now in position to bridge the valve seat 34 so that the ports 33 and 35 are fluidly interconnected together.

Subsequently, should the temperature being sensed by the temperature responsive device 31 fall below a predetermined temperature, the wax charge within the cylinder 32 contracts and the force of the compression spring 29 again moves the valve member 28 axially to the right from the position illustrated in FIG. 4 back to the position illustrated in FIG. 2 whereby the valve member 28 again interconnects the ports 35 and 36 through the grooves 57 and disconnects the ports 33 and 35 as the grooves 59 have been moved from bridging relation with the valve seat means 34.

Therefore, it can be seen that the invention of the aforementioned co-pending patent application not only provides an improved thermally responsive valve construction, but also that invention provides an improved method of making such a valve construction wherein the housing parts thereof are adapted to be uniquely assembled together and utilize simple resilient annular members for forming valve seats therebetween as well as for sealing the housing parts together.

However, it has been found according to the teachings of this invention that when the housing parts 22, 23 and 24 are formed of plastic material and are ultrasonically welded together, the flowing plastic material known as "flash" at the abutting surfaces 66 and 67 of the housing parts 22 and 23 and the abutting adjacent surfaces 68 and 69 of the housing parts 23 and 24 tends to flow to the annular resilient members 34 and 37 and adversely effect the same by flowing onto the inner peripheral surfaces thereof so that the same do not perform an adequate sealing function with the axially movable valve member 28.

Accordingly, it is a feature of this invention to provide a valve construction of the above described type which can readily permit the plastic housing parts thereof to be ultrasonically welded together in a manner which will not adversely affect the annular resilient members that form the valve seats thereof.

Accordingly, reference is now made to FIG. 6 of the drawings wherein an improved valve construction of this invention is generally indicated by the reference numeral 20A and parts thereof similar to parts of the valve construction 20 of the aforementioned co-pending patent application are indicated by the same reference numeral followed by the reference letter "A".

In particular, it can be seen in FIG. 6 that the valve construction 20A of this invention is substantially identical to the valve construction 20 previously described except for the interconnection between the adjacent housing members 22A, 23A and 24A.

For example, the housing member 22A has the substantially flat outer surface 67A of the inwardly directed end annular shoulder 45A thereof interrupted by an annular groove 70 which is disposed intermediate the inner and outer peripheral surfaces 71 and 72 of the annular shoulder 45A.

Figure 8:
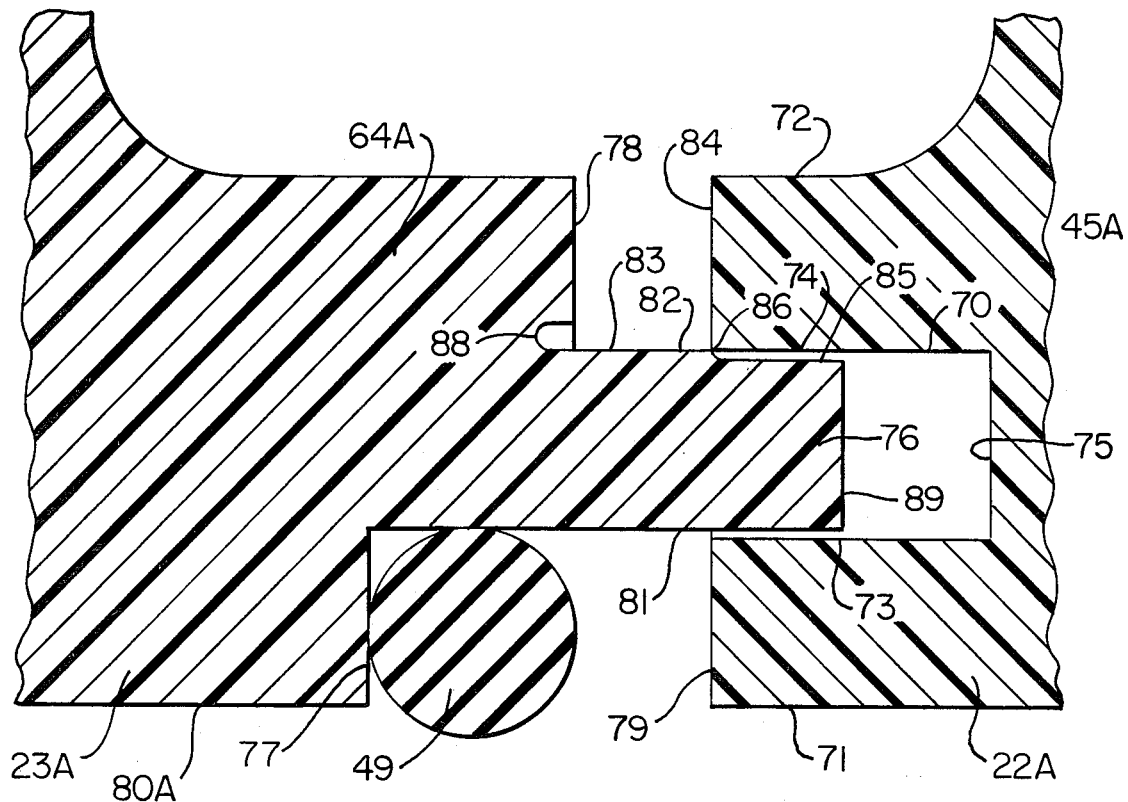
FIG. 8 is an enlarged fragmentary cross-sectional view illustrating the method of assembling together two of the housing members of the valve construction of FIG. 6.
Figure 9:
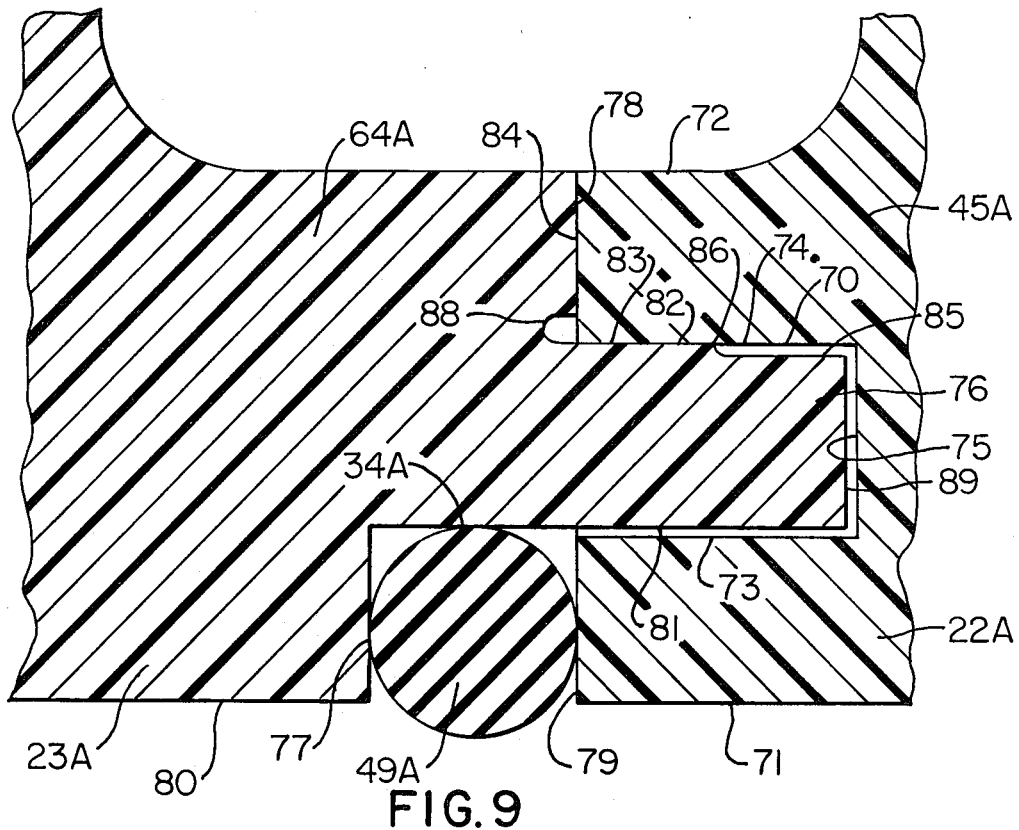
FIG. 9 is a view similar to FIG. 8 and illustrates a further step in the method of assembling the housing members of the valve construction of this invention.

The groove 70 defines an inner annular groove wall 73 and an outer annular groove wall 74 as well as an annular end wall 75 as illustrated not only in FIG. 6, but also in FIGS. 8 and 9.

The adjacent housing member 23A has its inwardly directed annular end shoulder 64A stepped in such a manner that the same has an outwardly directed annular tongue 76 adapted to be telescopically received in the annular groove 70 as illustrated in FIG. 6 so that the annular resilient member 34A will be compressed between an inner annular part 77 of the end surface 78 of the shoulder 64A and the inner annular part 79 of the end surface 67A of the shoulder 45A while projecting inwardly beyond the inner peripheral surface 71 of the shoulder 45A and the inner peripheral surface 80 of the shoulder 64A to sealing engage against the valve member 28A to perform a valve seat function therewith in the same manner as the resilient member 34 of the valve construction 20 previously described.

As best illustrated in FIG. 9, the annular tongue 76 has an inner annular side 81 and a stepped outer annular side 82 which has a part 83 adjacent the outboard annular part 84 of the side 78 of the shoulder 64A that performs an interference fit with the outer groove wall 74 of the groove 70 so that when the tongue 76 is initially fitted into the groove 70, the forward part 85 of the outer side 82 of the tongue 76 readily clears with the outer annular groove wall 74 as illustrated in FIG. 8 to permit partial insertion of the tongue 76 therein until the junction point 86 between the parts 83 and 85 of the outer peripheral side 82 of the tongue 76 engages the junction point 87 between the groove 70 and the end surface 67A of the shoulder 45A as illustrated in FIG. 8, the inner annular side 81 of the tongue 76 being completely clear of the inner groove wall 73 as illustrated in FIGS. 8 and 9 to provide a loose fit therewith.

In this manner, with the housing members 22A and 23A partially assembled together as illustrated in FIG. 8, the same can be engaged by an ultrasonic welding horn or tool to cause vibration and compaction therebetween so that the tongue 76 will be fully inserted in the groove 70 in the manner illustrated in FIG. 9 and have the surfaces 78 and 84 abut against each other outboard of the tongue 76 as illustrated in FIG. 9 whereby an ultrasonic weld area will be created between the interference part 83 of the outer side 82 of the tongue 76 and the outer annular groove wall 78 of the housing part 22A as illustrated.

The resulting weld flashing that occurs from the ultrasonic welding operation and moves or flows to the left in FIG. 9 is trapped in an annular recess 88 formed in the surface 78 of the shoulder 64A adjacent the tongue 76 and the weld flashing that moves or flows to the right of the weld area is trapped in the spacing provided between the reduced part 85 of the outer side 82 of the tongue 76 and the outer groove wall 74 as well as in the spacing between the end 89 of the tongue 76 and the annular end wall 75 of the groove 70 as illustrated in FIG. 9 whereby the ultrasonic weld area between the tongue 76 and the housing part 22A is completely isolated from the annular resilient member 34A which is completely trapped between the compressing parts 77 and 79 of the housing members 22A and 23A as well as in engagement with the inner side 81 of the tongue 76 as illustrated in FIG. 9 to form the valve seat function and housing member sealing function thereof as previously described.

Therefore, it can be seen that each adjacent pair of housing members 22A and 23A or 23 A and 24A can be ultrasonically welded together by the method of this invention to form ultrasonic weld areas isolated from their respective annular resilient valve seat members in the manner previously described in connection with FIGS. 8 and 9 so that any desired number of housing members 23A can be disposed in stacked relation in the manner illustrated in FIG. 7 between the main housing part 22A and the end cap housing part 24A. Of course, the end cap 24A could be directly ultrasonically welded to the main housing member 22A without an intermediate housing member 23A if desired.

It is believed that the tongue and groove arrangement of the housing members 22A, 23A, and 24A of this invention is unique in the ultrasonic welding thereof not only for isolating the resulting weld area from the resilient valve seat members, but also through the interference side fit thereof because the prior known ultrasonic welding operation for a tongue and groove arrangement is to provide a force director on the end of the tongue, such as at the surface 89 thereof, to engage against the bottom 75 of the groove 70 to ultrasonically weld the end surface 89 to the bottom wall 75 of the groove 70 of such a tongue and groove arrangement.

Since the operation of the valve construction 20A of this invention is identical to the operation of the valve construction 20 as previously described, it is deemed unnecessary to describe the operation of the valve construction 20A.

Therefore, it can be seen that this invention not only provides an improved valve construction, but also this invention provides an improved method of making such a valve construction or the like.

While the forms and methods of this invention now preferred have been illustrated and described as required by the Patent Statute, it is to be understood that other forms and method steps can be utilized and still fall within the scope of the appended claims.

What is claimed is:

1. In a valve construction having a first housing means provided with an internal chamber therein and inwardly directed shoulder projecting into said chamber at one end thereof and defining a first valve seat on one side thereof, and a second housing means being secured to said first housing means and having a chamber aligned with said chamber of said first housing means, said second housing means having an inwardly directed shoulder projecting into its respective chamber at one end thereof, said first valve seat comprising a resilient annular member disposed against said one side of said shoulder of said first housing means and against an adjacent side of said shoulder of said second housing means while projecting inwardly beyond said shoulders, the improvement wherein one of said housing means has an annular groove in the shoulder thereof inboard of the inner and outer peripheries thereof, the other of said housing means having an annular tongue projecting from the shoulder thereof inboard of the inner and outer peripheries thereof and having an inner annular side and an outer annular side spaced from each other by an end surface of said tongue, said tongue having said inner side thereof engaging the outer periphery of said resilient annular member, said tongue being received in said groove and being ultrasonically welded substantially only on said outer annular side thereof to the housing means having said groove whereby the resulting weld area is isolated from said resilient annular member by said end surface and said inner annular side of said tongue.

2. A valve construction as set forth in claim 1 wherein said shoulders of said housing members abut each other outboard of said tongue.

3. A valve construction as set forth in claim 1 wherein said groove defines an outer annular groove wall and an inner annular groove wall, one of said outer annular groove wall and said outer side of said tongue being stepped along the length thereof so that part of the length of the same provides an interference fit with the other of said outer annular groove wall and said outer side of said tongue to define said weld area therebetween.

4. A valve construction as set forth in claim 3 wherein said tongue is so stepped, said tongue having the interference length thereof adjacent said side of said shoulder thereof.

5. A valve construction as set forth in claim 4 wherein said side of said shoulder that carries said tongue is annularly recessed adjacent said outer side of said tongue to receive flashing from said weld area.

6. A valve construction as set forth in claim 4 wherein the remaining part of said outer side of said tongue is spaced from said outer groove wall to receive flashing from said weld area.

7. A valve construction as set forth in claim 6 wherein said end surface of said tongue terminates spaced from the bottom of said groove to also provide for means to receive flashing from said weld area.

8. A valve construction as set forth in claim 7 wherein said aligned chambers define a longitudinal axis of said valve construction, said outer annular side of said tongue being substantially parallel to said longitudinal axis, said one side of said first housing means and said adjacent side of said second housing means being substantially perpendicular to said longitudinal axis.

9. In a condition responsive valve construction having a first housing means provided with an internal chamber therein and an inwardly directed shoulder projecting into said chamber at one end thereof and defining a first valve seat on one side thereof and a spring seat on the other side thereof, an axially movable valve member disposed in said chamber for controlling said first valve seat, a spring disposed between said spring seat and said valve member to tend to move said valve member in one axial direction in said chamber, and a condition responsive device carried by said first housing means and being operatively interconnected to said valve member to move said valve member in the other axial direction upon an increase in sensed condition, and a second housing means being secured to said first housing means and having a chamber aligned with said chamber of said first housing means and receiving said valve member therein, said second housing means having an inwardly directed shoulder projecting into its respective chamber at one end thereof, said first valve seat comprising a resilient annular member disposed against said one side of said shoulder of said first housing means and against an adjacent side of said shoulder of said second housing means while projecting inwardly beyond said shoulders to sealingly engage said valve member, the improvement wherein one of said housing means has an annular groove in the shoulder thereof inboard of the inner and outer peripheries thereof, the other of said housing means having an annular tongue projecting from the shoulder thereof inboard of the inner and outer peripheries thereof and having an inner annular side and an outer annular side spaced from each other by an end surface of said tongue, said tongue having said inner side thereof engaging the outer periphery of said resilient annular member, said tongue being received in said groove and being ultrasonically welded substantially only on said outer annular side thereof to the housing means having said groove whereby the resulting weld area is isolated from said resilient annular member by said end surface and said inner annular side of said tongue.

10. A valve construction as set forth in claim 9 wherein said shoulders of said housing members abut each other outboard of said tongue.

11. A valve construction as set forth in claim 9 wherein said groove defines an outer annular groove wall and an inner annular groove wall, one of said outer annular groove wall and said outer side of said tongue being stepped along the length thereof so that part of the length of the same provides an interference fit with the other of said outer annular groove wall and said outer side of said tongue to define said weld area therebetween.

12. A valve construction as set forth in claim 11 wherein said tongue is so stepped, said tongue having the interference length thereof adjacent said side of said shoulder thereof.

13. A valve construction as set forth in claim 12 wherein said side of said shoulder that carries said tongue is annularly recessed adjacent said outer side of said tongue to receive flashing from said weld area.

14. A valve construction as set forth in claim 12 wherein the remaining part of said outer side of said tongue is spaced from said outer groove wall to receive flashing from said weld area.

15. A valve construction as set forth in claim 14 wherein said end surface of said tongue terminates spaced from the bottom of said groove to also provide for means to receive flashing from said weld area.

16. A valve construction as set forth in claim 15 wherein said aligned chambers define a longitudinal axis of said valve construction, said outer annular side of said tongue being substantially parallel to said longitudinal axis, said one side of said first housing means and said adjacent side of said second housing means being substantially perpendicular to said longitudinal axis.

17. In a method of making a valve construction having a first housing means provided with an internal chamber therein and an inwardly directed shoulder projecting into said chamber at one end thereof and defining a first valve seat on one side thereof, and a second housing means being secured to said first housing means and having a chamber aligned with said chamber of said first housing means, said second housing means having an inwardly directed shoulder projecting into its respective chamber at one end thereof, said first valve seat comprising a resilient annular member disposed against said one side of said shoulder of said first housing means and against an adjacent side of said shoulder of said second housing means while projecting inwardly beyond said shoulders, the improvement comprising the steps of forming one of said housing means with an annular groove in the shoulder thereof inboard of the inner and outer peripheries thereof, forming the other of said housing means with an annular tongue projecting from the shoulder thereof inboard of the inner and outer peripheries thereof, forming said tongue to have an inner annular side and an outer annular side spaced from each other by an end surface of said tongue, disposing said tongue in said groove so that said tongue has said inner annular side thereof engaging the outer periphery of said resilient annular member, and ultrasonically welding substantially only said outer annular side of said tongue to the housing means having said groove whereby the resulting weld area is isolated from said resilient annular member by said end surface and said inner annular side of said tongue.

18. A method of making a valve construction as set forth in claim 17 and including the step of forming said shoulders of said housing members to abut each other outboard of said tongue.

19. A method of making a valve construction as set forth in claim 17 and including the step of stepping one of the outer annular groove wall and said outer side of said tongue along the length thereof so that part of the length of the same provides an interference fit with the other of said outer annular groove wall and said outer side of said tongue to define said weld area therebetween.

20. A method of making a valve construction as set forth in claim 19 wherein said step of stepping causes said tongue to be so stepped that said tongue has the interference length thereof adjacent said side of said shoulder thereof.

21. A method of making a valve construction as set forth in claim 20 and including the step of forming said side of said shoulder that carries said tongue with an annular recess adjacent said outer side of said tongue to receive flashing from said weld area.

22. A method of making a valve construction as set forth in claim 20 and including the step of forming the remaining part of said outer side of said tongue to be spaced from said outer groove wall to receive flashing from said weld area.

23. A method of making a valve construction as set forth in claim 20 and including the step of forming said tongue to have said end surface thereof terminate spaced from the bottom of said groove to also provide for means to receive flashing from said weld area.

24. A method of making a valve construction as set forth in claim 23 and including the steps of forming said aligned chambers to define a longitudinal axis of said valve construction, forming said outer annular side of said tongue to be substantially parallel to said longitudinal axis, and forming said one side of said first housing means and said adjacent side of said second housing means to be substantially perpendicular to said longitudinal axis.

* * * * *